May 8, 1923.  1,454,295
W. A. MAAS ET AL
TIRE HEATER
Filed July 15, 1921.
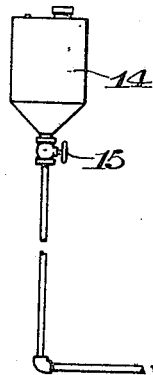
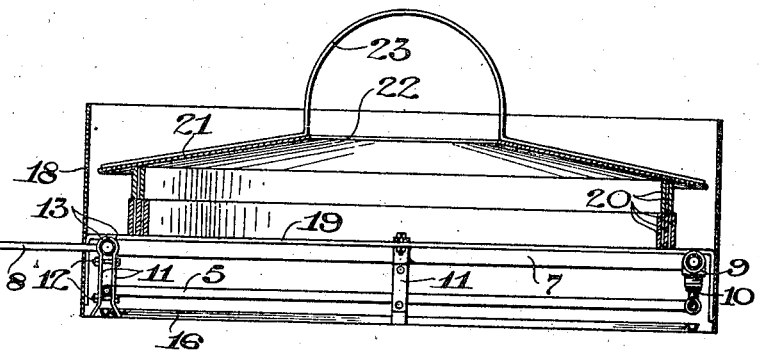
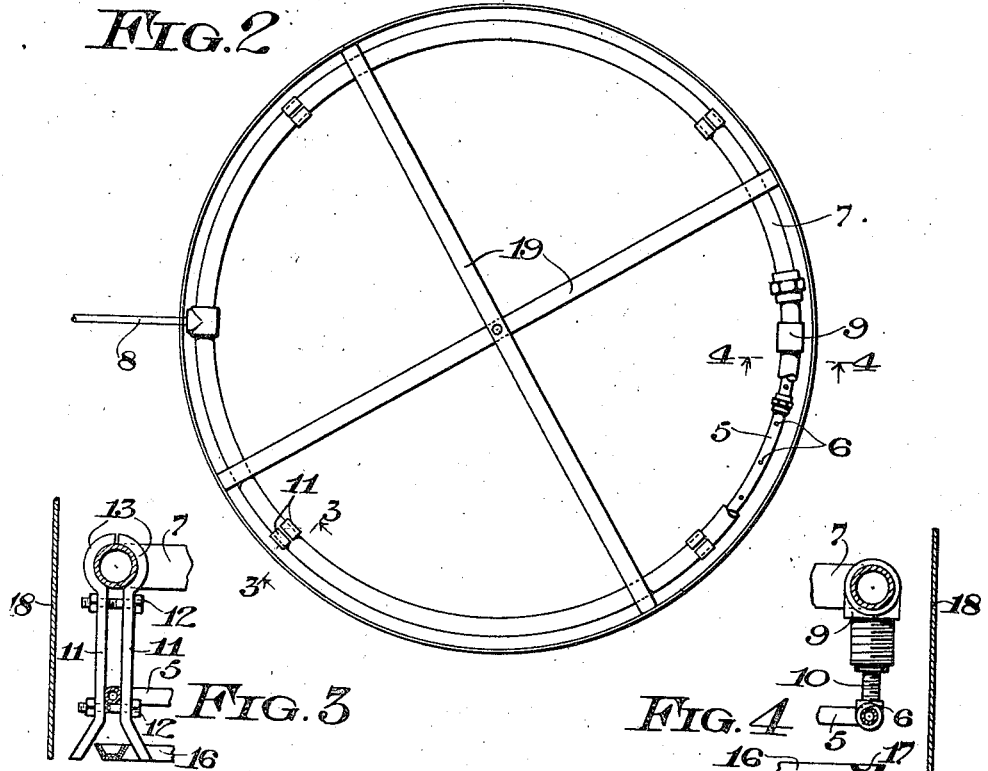
WITNESSES
INVENTORS
ATTORNEY Patented May 8, 1923.

1,454,295

UNITED STATES PATENT OFFICE.

WILLIAM A. MAAS AND THOMAS J. MAAS, OF WATERFORD, WISCONSIN.

TIRE HEATER.

Application filed July 15, 1921. Serial No. 484,905.

*To all whom it may concern:*

Be it known that we, WILLIAM A. MAAS and THOMAS J. MAAS, citizens of the United States, and residents of Waterford, in the county of Racine and State of Wisconsin, have invented new and useful Improvements in Tire Heaters, of which the following is a description, reference being had to the accompanying drawings, which are a part of this specification.

The invention relates to tire heaters.

The object of the invention is to provide a heater of simple and economical construction for heating the metal tire so that it may be shrunk onto the felly of the wheel, the heater being designed so as to use a cheap grade of liquid fuel, as kerosene.

The invention further consists in the several features hereinafter set forth and more particularly defined by claims at the conclusion hereof.

In the drawings: Fig. 1 is a vertical sectional view through a heater embodying the invention; Fig. 2 is a plan view of the heater with the cover removed and parts broken away; Fig. 3 is a detail sectional view taken on the line 3—3 of Fig. 2; Fig. 4 is a detail sectional view taken on the line 4—4 of Fig. 2.

The heater includes a burner 5 consisting of a pipe bent into a ring-shaped form and having burner openings 6 in its top, and a vaporizer 7 consisting of a pipe bent into a ring-shaped form and having connection with a fuel supply pipe 8 and connected by a suitable coupling 9 with a pipe 10 communicating with the burner. The burner 5 and vaporizer 7 are held together and supported by a plurality of standards, each standard comprising a pair of legs 11 secured in clamping engagement with said burner and vaporizer by means of bolts 12. The central diameters of both burner and vaporizer are the same and they are concentrically disposed so that the flame jets heat the vaporizer spaced a short distance above the burner. The upper ends 13 of these legs are curved to fit the vaporizer pipe while the burner is disposed between the legs and may rest on the lower bolt 12, as shown in Fig. 3. The supply pipe 8 leads to a supply tank 14 provided with a control valve 15. An annular priming pan 16 is disposed beneath the burner 5 and is provided with an asbestos lined trough 17.

A cylindrical shell 18 is adapted to surround the burner and has rack or tire supporting bars 19 secured thereto and extending across and above the vaporizer to receive the tire rims 20 to be heated. A conical cover 21 having a central opening 22 and a handle 23 is designed to fit upon and project over the tires so as to confine the heat and restrict the passage of and direct the burning gases against them. The cover is preferably designed to fit within the shell and upon the tires so as to more effectively confine the heat about any number of tires resting upon the bars 19.

Where kerosene is used as fuel a priming charge introduced in the pan 16 and ignited serves to initially heat the burner and thereafter the burner heats the vaporizer so that it supplies vaporized fuel to the burner which is consumed at the jets 6, the hot gases from the burner serving to heat the tires to such a temperature as to permit them to be shrunk upon the felloes of the wheels.

What we claim as our invention is:

1. A tire heater comprising a ring-shaped burner, a cylindrical shell surrounding the burner, a member carried by the shell and supporting the tires above the burner, and a conical cover disposable within the shell and resting on the uppermost tire or tires and having a central opening.

2. A tire heater comprising a ring-shaped vaporizer and a ring-shaped burner directly beneath said vaporizer, a fuel supply pipe, a T-fitting inlet connecting said pipe with said vaporizer, a coupling between the burner and vaporizer diametrically disposed with respect to said inlet, supporting brackets sustaining the vaporizer above the burner and the burner in elevated position, each bracket including a pair of legs and bolts for clamping said legs to the vaporizer and burner, a cylindrical shell surrounding the burner, and tire supports within the shell.

In testimony whereof, we affix our signatures.

WILLIAM A. MAAS.
THOMAS J. MAAS.